US006730771B2

United States Patent
Van Benthem et al.

(10) Patent No.: US 6,730,771 B2
(45) Date of Patent: May 4, 2004

(54) CONDENSATION POLYMER CONTAINING DIALKYLAMIDE ENDGROUPS, PROCESS FOR PRODUCING SAID CONDENSATION POLYMERS AND APPLICATIONS THEREOF

(75) Inventors: Rudolfus A. T. M. Van Benthem, Limbricht; Peter E. Froehling, Sittard, both of (NL)

(73) Assignee: DSM N.V., TE Heerlen (NL)

(*) Notice: Subject to any disclaimer, the term of this patent is extended or adjusted under 35 U.S.C. 154(b) by 426 days.

(21) Appl. No.: 09/960,951

(22) Filed: Sep. 25, 2001

(65) Prior Publication Data
US 2002/0019509 A1 Feb. 14, 2002

Related U.S. Application Data

(63) Continuation of application No. PCT/NL00/00197, filed on Feb. 23, 2000.

(30) Foreign Application Priority Data

Mar. 26, 1999 (EP) .............................. 99200929

(51) Int. Cl.$^7$ .............................. C08G 69/26
(52) U.S. Cl. ................ 528/335; 528/288; 528/292; 528/302; 528/332; 528/422
(58) Field of Search ................ 528/288, 292, 528/302, 332, 335, 422

(56) References Cited

U.S. PATENT DOCUMENTS 3,709,858 A    1/1973   Albers et al.

*Primary Examiner*—Samuel A. Acquah
(74) *Attorney, Agent, or Firm*—Pillsbury Winthrop LLP

(57) ABSTRACT

The invention relates to a condensation polymer, as well as to a process for preparation said polymers, having at least one dialkylamide endgroup connected through the polymer backbone to a unit derived from an alkylamide, the connection comprising at least one ester linkage. The polymer according to the invention can be linear or branched. The condensation polymers can be very widely used in technically different fields, both in thermosetting and in thermoplastic applications. The invention also relates to a composition comprising the condensation polymer according to the invention, an active substance and a polymer, as well as to a process for incorporating an active substance in an object comprising at least of a polymer composition, by bringing the object into contact with the active substance. More in particular, the invention relates to the dying of polymer fibers.

20 Claims, No Drawings

CONDENSATION POLYMER CONTAINING DIALKYLAMIDE ENDGROUPS, PROCESS FOR PRODUCING SAID CONDENSATION POLYMERS AND APPLICATIONS THEREOF

CROSS-REFERENCE TO RELATED APPLICATIONS

This Application is a continuation of International Application PCT/NL00/00197, filed Feb. 23, 2000, which designated the U.S. and was published in the English language.

The invention relates to a condensation polymer having at least one dialkylamide endgroup connected through the polymer backbone to a unit derived from an alkylamide, the connection comprising at least one ester linkage.

According to a preferred embodiment, the polymer according to the invention contains at least two groups according to formula (I)

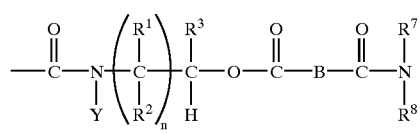

in which

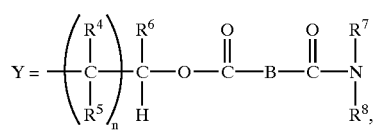

H, a ($C_1$–$C_{20}$) alkylgroup or a ($C_6$–$C_{10}$) arylgroup;
B=a ($C_6$–$C_{24}$) aryldiradical or a ($C_2$–$C_{24}$) alkyldiradical;
$R^1$, $R^2$, $R^3$, $R^4$, $R^5$ and $R^6$ may, independently of one another, be chosen from the group of H, ($C_6$–$C_{10}$) arylgroups or ($C_1$–$C_8$) alkylgroups;
$R^7$ and $R^8$ may, independently of one another, be chosen from the group of optionally heteroatom substituted ($C_6$–$C_{10}$) arylgroups or optionally heteroatom substituted ($C_1$–$C_{28}$) alkylgroups and n=1–4. Preferably, n=1.

According to a further preferred embodiment, the polymer according to the invention is a polymer according to formula (II):

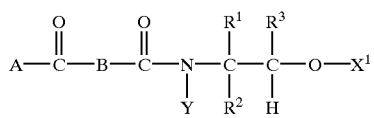

in which:

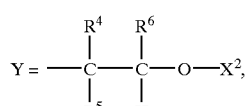

H, a ($C_1$–$C_{20}$) alkylgroup or a ($C_6$–$C_{10}$) arylgroup;

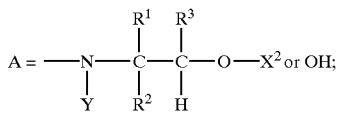

B=a ($C_6$–$C_{24}$) aryldiradical or a ($C_2$–$C_{24}$) alkyldiradical;

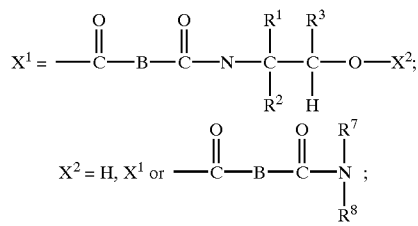

$R^1$, $R^2$, $R^3$, $R^4$, $R^5$ and $R^6$ may, independently of one another, be chosen from the group of H, ($C_6$–$C_{10}$) arylgroups, ($C_1$–$C_8$) alkylgroups or —$CH_2$—$OX^2$;
$R^7$ and $R^8$ may, independently of one another, be chosen from the group of optionally heteroatom substituted ($C_6$–$C_{10}$) arylgroups or optionally heteroatom substituted ($C_1$–$C_{28}$) alkylgroups.

Preferably, $R_1$ and $R_2$ are both equal to H.

According to a further preferred embodiment, the polymer according to the invention has a number of dialkylamide endgroups $\geq 3$ and the polymer is represented by formula (III):

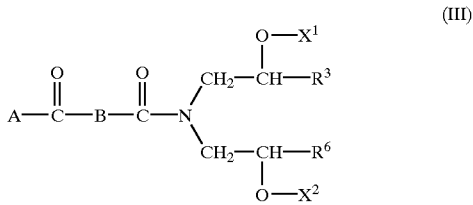

in which

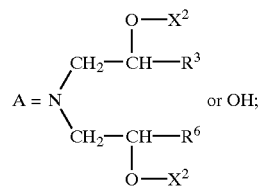

B=a ($C_6$–$C_{24}$) aryldiradical or a ($C_2$–$C_{24}$) alkyldiradical;

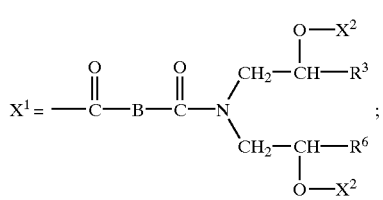

-continued

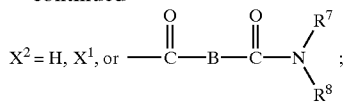

$R^3$ and $R^6$ are chosen from the group of H, ($C_6$–$C_{10}$) arylgroups and ($C_1$–$C_8$) alkylgroups;

$R^7$ and $R^8$ may, independently of one another, be chosen from the group of optionally heteroatom substituted ($C_6$–$C_{10}$) arylgroups or optionally heteroatom substituted ($C_1$–$C_{28}$) alkylgroups.

In all above embodiments, preferably, $R^3$ and $R^6$ are ($C_1$–$C_4$) alkyl groups, more preferably a methyl- or ethylgroup. In all above embodiments, preferably, $R^7$ and $R^8$ are optionally hetero-atom substituted ($C_1$–$C_{20}$) alkyl groups, more preferably, $R^7$ and $R^8$ are hetero-atom substituted $C_2$-, $C_3$- or $C_6$-alkylgroups. $R^7$ and $R^8$ may be substituted with a group selected from the group of alcohol, ether, ester, cyanide, carbonate, urethane, urea, amide, imide, amine, imine, imidazole, oxime, sulfide, thiol, thiourea, sulfon, sulfoxide, sulfate, fosfate, fosfine, fosfinoxide, silane, silicone, silicate, fluoro, chloro, bromo or iodo groups. Suitable choices for $R^7$ and $R^8$ are di(m)ethylaminoethyl, di(m)ethylaminopropyl, di(m)ethylaminohexyl, tri(m)ethylsilylpropyl, tri(m)ethoxysilylpropyl, perfluoro-octyl, perfluoro-octyl-(m)ethyl, (m)ethoxy-ethyl, (m)ethoxy-2-propyl, maleimido-propyl, maleimidohexyl, octenylsuccinimido-hexyl, hexahydrophthalimidohexyl, 2-(benz)imidazole-ethyl, difenylfosfino-ethyl, furfuryl, cyanoethyl, or cyanopropyl groups. $R^7$ and $R^8$ can also be part of the same optionally substituted cyclic group, such as a morfoline, thiomorfoline, piperidine, pyrrolidine, oxazolidine, thiazolidine or piperazine group.

In all formulas in this application in which R-groups are present, the R groups may together or with neighbouring carbon atoms form part of a cycloalkyl group.

Depending on the starting monomers chosen, B, $R^1$, $R^2$, $R^3$, $R^4$, $R^5$, $R^6$, $R^7$ and $R^8$ in the molecule or mixture of molecules can be selected to be the same or different.

B is optionally substituted, preferably with a ($C_1$–$C_{26}$) alkyl group. Preferably, the alkylgroup is chosen from the group of methyl, octenyl, nonenyl, decenyl, undecenyl or dodecenyl. Suitable choices for B are (alkyl-)1,2-ethylene, where the alkyl is defined as above, (methyl-)1,2-ethylidene, 1,3-propylene, (methyl-)1,2-cyclohexyl, (methyl-)1,2-phenylene, 1,3-phenylene, 1,4-phenylene, 2,3-norbornyl, 2,3-norbornen-5-yl or (methyl-)1,2 cyclohex-4-enyl radical.

Preferably, the weight average molecular mass of the polymer according to the invention is between 600 g/mol and 50,000 g/mol, more preferably between 800 g/mol and 25,000 g/mol.

Preferably, the number average molecular mass is between 500 g/mol and 15,000 g/mol, more preferably between 700 g/mol and 4,000 g/mol.

Preferably, the average number of dialkylamide endgroups per molecule is between 2 and 250, more preferably between 3 and 50.

The polymer according to the invention can be linear or branched. The linear polymer according to the invention generally comprises amide and ester units alternating along a chain as follows:

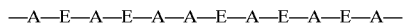

wherein a diamide (A—A) unit is coupled with alternating ester (E) and amide (A) units.

A branched polymer according to the invention generally comprises amide and the ester units alternating along the main and side chains as follows:

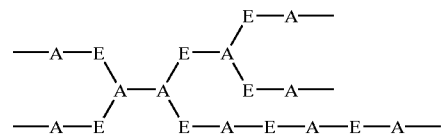

wherein a diamide (A—A) is coupled with alternating ester (E) and amide (A) units.

Preferably, in the branched polymer according to the invention a (β)-hydroxyalkylamide group is present, which can be both present as a bis-(β)-hydroxyalkylamide endgroup, such as

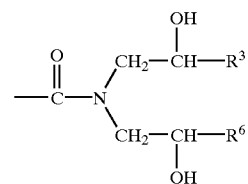

or as a pendant side chain group, such as

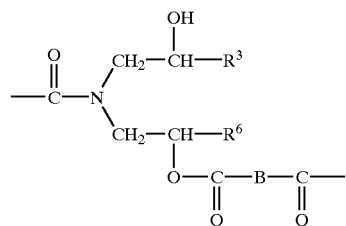

Preferably, the molar amount of amide units in the chain is higher than the molar amount of ester units.

The invention also relates to a process for the production of the polymer according to the invention.

According to a preferred embodiment, the polymer according to the invention can be obtained through polycondensation of a mono- and/or bis-hydroxyalkylamide of a dicarboxylic acid in the presence of a mono-dialkylamide of a dicarboxylic acid.

Preferably, the mono-hydroxyalkylamide of the dicarboxylic acid is a compound according to formula (IV):

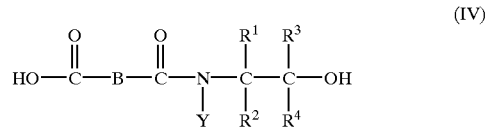

(IV)

Preferably, the mono-dialkylamide of the dicarboxylic acid is a compound according to formula (V):

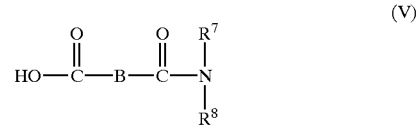

(V)

Preferably, the bis-hydroxyalkylamide of the dicarboxylic acid is a compound according to formula (VI):

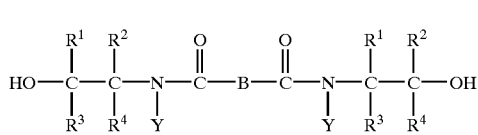

(VI)

wherein (in formula's IV, V and VI)

$R^1$, $R^2$, $R^3$ and $R^4$ may, independently of one another, be chosen from the group of H, ($C_6$–$C_{10}$) arylgroups or ($C_1$–$C_8$) alkylgroups;

$R^7$ and $R^8$ may, independently of one another, be chosen from the group of optionally heteroatom substituted ($C_6$–$C_{10}$) arylgroups or optionally heteroatom substituted ($C_1$–$C_{28}$) alkylgroups and B may be a ($C_6$–$C_{24}$) aryldiradical or a ($C_2$–$C_{24}$) alkyldiradical.

According to a further preferred embodiment, the polymer according to the invention can be obtained in a one-step procedure by reacting a cyclic anhydride, a dialkylamine and an alkanolamine, at room temperature or at an elevated temperature, preferably between about 20° C. and about 120° C., to form hydroxyalkylamide and dialkylamides, after which, at an elevated temperature, preferably between 120° C. and 250° C., a polyesteramide is obtained through polycondensation with water being removed, preferably through distillation.

The one-step procedure can take place with or without a solvent. Suitable solvents are water or an organic solvents, such as methyl-isobutylketon, butylacetate, toluene or xylene.

The removal of water through distillation can take place at either reduced or elevated pressure, such as at a pressure higher than $1.10^5$ Pa, in a vacuum ($<1.10^5$ Pa) or azeotropically.

Preferably, the cyclic anhydride is an anhydride according to formula (VII):

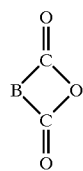

(VII)

in which B has the meaning as specified above.

Examples of suitable cyclic anhydrides include phthalic anhydride, tetrahydrophthalic anhydride, naphtalenic dicarboxylic anhydride, hexahydrophthalic anhydride, 5-norbornene-2,3-dicarboxylic anhydride, norbornene-2,3-dicarboxylic anhydride, naphtalenic dicarboxylic anhydride, 2-octene-1-yl-succinic anhydride, 2-nonene-1-yl-succinic anhydride, 2-decene-1-yl-succinic anhydride, 2-undecene-1-yl-succinic anhydride 2-dodecene-1-yl-succinic anhydride, maleic anhydride, (methyl)succinic anhydride, glutaric anhydride, 4-methylphthalic anhydride, 4-methylhexahydrophthalic anhydride, 4-methyltetrahydrophthalic anhydride, maleinised polyisobutane, maleinised polybutadiene and the maleinised alkylester of an unsaturated fatty acid.

Preferably the alkanolamine is compound according to formula (VIII):

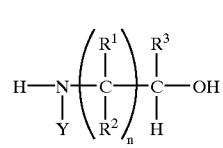

(VIII)

in which:

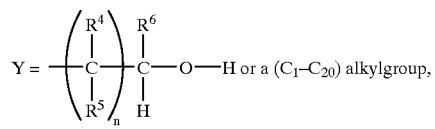

$R^1$, $R^2$, $R^3$, $R^4$, $R^5$ and $R^6$ may, independently of one another, be chosen from the group of H, ($C_6$–$C_{10}$) arylgroups, ($C_1$–$C_8$) alkylgroups or $CH_2OH$ and n=1–4. More preferably, n=1.

The alkanolamine may be a monoalkanolamine, a dialkanolamine, a trialkanolamine or a mixture hereof.

If monoalkanolamines are used in the process according to the invention, linear polymers with a functionality of 2 can be obtained. Depending on the application desired, a linear or an entirely or partly branched polymer can be chosen, in which case the degree of branching can be set by choosing the type of alkanolamine.

If a highly branched structure with a high functionality is desired, di- or trialkanolamines are used as the starting compound.

Examples of suitable mono-β-alkanolamines include ethanolamine, 1-(m)ethyl ethanolamine, n-butyl ethanolamine, 1-(m)ethyl isopropanolamine, isobutanolamine, β-cyclohexanolamine, n-butyl isopropanolamine and n-propanolamine.

Examples of suitable di-β-alkanolamines are 3-amino-1,2-propanediol, 2-amino-1,3-propanediol diisobutanolamine (bis-2-hydroxy-1-butyl)amine), di-β-cyclohexanolamine and diisopropanolamine (bis-2-hydroxy-1-propyl)amine).

A suitable trialkanolamine is, for example, tris (hydroxymethyl)aminomethane.

Preferably a β-alkyl-substituted β-hydroxyalkylamide is used. Examples are (di)isopropanolamine, cyclohexyl isopropanolamine, 1-(m)ethyl isopropanolamine, (di) isobutanolamine, di-β-cyclohexanolamine and/or n-butyl isopropanolamine. Most preferably, diisopropanolamine and diisobutanolamine are used. The choice of a β-alkyl-substituted β-hydroxyalkylamide results in a polymer with improved resistance to hydrolysis.

Preferably, the dialkylamine is an amine according to formula (IX)

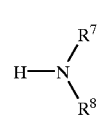

(IX)

in which $R^7$ and $R^8$ may, independently of one another, be chosen from the group of optionally heteroatom substituted ($C_6$–$C_{10}$) arylgroups or optionally heteroatom substituted ($C_1$–$C_{28}$) alkylgroups.

Examples of suitable dialkylamines include: di(m) ethylamine, dibutylamine, dioctylamine, di-2-ethylhexyl-di (m)ethylamine, dibutylamine, dioctylamine, di-2-ethylhexyl-amine, distearylamine, diallylamine, dicrotylamine, N-(m)ethylallylamine, bis(aminopropyl)amine, bis(aminohexyl)amine, N-(m)ethyl-aminopropylamine, bis(di(m)ethylaminopropyl)amine, bis(di(m)ethylaminohexyl)amine, bis(di(m)ethylaminoethyl)amine, bis(trimethylsilylpropyl)amine, bis(tri(m)ethoxysilylpropyl)amine, bis(perfluorooctyl)amine, bis(perfluorooctyl-(m)ethyl)amine, bis(methoxyethyl)amine, N-(m)ethylmethoxypethylamine, bis(methoxy-2-propyl)amine, bis(maleimidohexyl)amine, bis(octenylsuccinimidopropyl)amine, bis(hexahydrophthalimidohexyl)amine, difurfurylamine, dicyano(m)ethylamine, bis(difenylfosfinoethyl)amine, morfoline, thiormorfoline, piperidine, pyrrolidine, (2-fenyl)oxazolidine, thiazolidine, piperazine, 2,2,6,6,-tetramethylpiperidine, iminodibenzyl, imidazole.

The anhydride:[alkanolamine+dialkylamine] equivalent ratio is generally between 1.5:1.0 and 1.0:2.0, preferably, between 1.0:1.0 and 1.0:1.8, more preferably, between 1:1.05 and 1:1.5.

The alkanolamine:dialkylamine equivalent ratio can be chosen according to the molecular weight and the number of β-hydroxyalkylamide and dialkylamide groups desired and is generally between 100:1 and 1:3, preferably between 10:1 and 1:2.

If only dialkylamide endgroups are desired in a highly branched structure, molar equivalent ratio's of dialkanol amine: dialkylamide: anhydride can be chosen as for example 1:3:3, 2:4:5, 3:5:7, 4:6:9, or generally as n:n+2:2n+1, in which n is an integer, larger than or equal to 1.

According to a further preferred embodiment, the polymer according to the invention can be obtained by a reaction between a dialkylamide and an alkanolamine and a compound containing an acid group and an activated acid group, after which a polyesteramide is obtained through polycondensation.

Preferred dialkylamide and alkanolamine have been described above.

The compound containing an acid group and an activated acid group is preferably a compound according to formula (X):

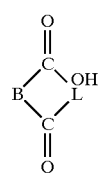

(X)

in which
B=a ($C_6$–$C_{24}$) aryldiradical or a ($C_2$–$C_{24}$) alkyldiradical and

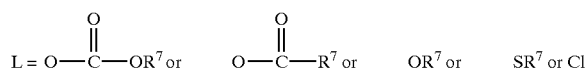

in which $R^7$ is a ($C_1$–$C_{12}$) branched or linear alkyl group.

Examples of suitable compounds containing an acid group and an activated acid group are alkyl esters, such as, for example, mono(m)ethyl adipate and mono(m)ethyl sebacate, anhydrides and thioesters.

According to a further preferred embodiment, the polymer according to the invention can be obtained by a reaction between a cyclic anhydride, as for example described above, and an alcohol, after which the reaction product obtained reacts in situ with an alkanolamine and a polyesteramide is subsequently obtained through polycondensation.

Examples of suitable alcohols are ($C_1$–$C_{10}$) alcohols. Preferably, methanol or ethanol is used.

In addition to dialkylamide groups, the polymer may also contain carboxyl groups and/or β-hydroxyalkylamide groups, carboxyl groups can be present in, for example, amounts of between 0.01 and 2.0 mg equivalent/gram of polymer. The number of carboxylic acids present in the polymer can be controlled via the anhydride/amine ratio and via the degree of conversion. If an amine excess is used and the polycondensation reaction is (almost) complete, less than 0.2 mg equivalent acid/gram of polymer is usually present. If carboxyl groups are present, they may in a subsequent step react with compounds containing one or more groups that can react with carboxylic acid, such as for example epoxy groups or β-hydroxyalkylamide groups. The amount of carboxylic acid is preferably as low as possible, for example between 0.01 and 0.2 mg equivalent/gram of polymer.

β-hydroxyalkylamide groups may be present in amounts of between 0.01 and 5.0 mg equivalent/gram polymer. The amount of β-hydroxyalkylamide groups can be controlled via the alkanolamine/dialkylamine ratio and via the degree of conversion. If a dialkylamine excess is used and the polycondensation reaction is (almost) complete, less than 0.5 mg equivalent/gram of polymer is usually present. If β-hydroxyalkylamide groups are present they may in a subsequent step react with compounds containing one or more groups that can react with β-hydroxyalkylamides, such as for example carboxyl acids, carboxylic anhydrides, isocyanates, activated esters or carboxylic halides.

The degree of branching and the functionality of the polymer are dependent on the starting materials and the molecular weight of the polymer. A molecular weight higher than 2,000 and the use of di- and/or trialkanolamines generally lead to highly branched structures with a functionality of ≧6.

Due to the presence in amounts of less than 10% by weight (of the total amount of anhydrides) of bis- and dianhydrides instead of the anhydrides according to formula (VII), it is possible that the polymer does not comprise only of units according to formulas (II) and (III).

Due to side reactions during the preparation of the polymer it is possible that the reaction mixture comprising the condensation polymer according to the invention comprises also secundary amine groups, for example according to the formula (XI):

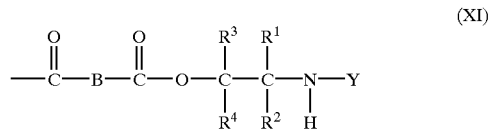

(XI)

wherein $R^1$, $R^2$, $R^3$, $R^4$ and B are defined as above.

The invention also relates to entirely or partly modified polymers.

The modification can for example take place via a reaction between the polymer according the invention with a monomer, oligomer or polymer containing reactive groups that can react with the β-hydroxyalkylamides.

Examples of suitable reactive groups include carboxyl groups, carboxylic esters, carboxylic anhydrides, epoxy groups, alkoxysilane groups, isocyanate groups, acid chloride groups, epoxychlorohydrine groups, amine groups, phenolic groups, methylolated amidegroups and combinations hereof.

Preferably the monomer, oligomer or polymer contains only one group that can react with hydroxylalkylamide, as a result of which no crosslinking takes place during the modification.

The polymer according to the invention can be modified preferably with a compound containing a carboxylic acid group.

A modified polymer can for example be represented by one of the formulas (II) or (III) in which

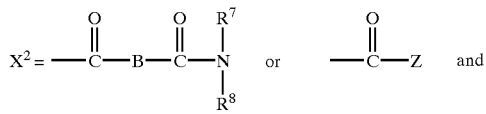

in which

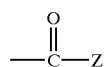

is derived from a monomeric, oligomeric or polymeric monofunctional carboxylic acid.

Suitable carboxylic acids are, for example, saturated aliphatic ($C_1$–$C_{26}$) acids, unsaturated ($C_1$–$C_{20}$) fatty acids, aromatic acids and α,β-unsaturated acids.

Examples of suitable α,β-unsaturated acids are (meth) acrylic acid, crotonic acid and monoesters or monoamides of itaconic acid, maleic acid, 12-hydroxystearic acid, polyether carboxylic acid, and fumaric acid.

Suitable saturated aliphatic acids are for example acetic acid, propionic acid, butyric acid, 2-ethyl hexanoic acid, laurylic acid and stearic acid.

Suitable aromatic acid are for example benzoic acid and tertiary butyl benzoic acid.

Z can be chosen from, for example, a saturated or unsaturated ($C_1$–$C_{40}$) alkyl or aromatic group, a polymer or an oligomer. Examples of suitable polymers are polyesters, polyethers and poly(capro)lactones.

Z can be substituted with for example ester groups, ether groups, amide groups and alcohol groups.

The modified polymer may consist of the same or different Z groups.

The branched polymer according to the invention can also react with a diisocyanate, after which the isocyanate-functional polymer obtained reacts with a compound capable of reacting with isocyanates. As the diisocyanate use is preferably made of a compound containing two or more isocyanate groups with different reactivities. This is preferably an aliphatic diisocyanate with one sterically more accessible isocyanate group bound to a primary carbon atom and one sterically less accessible isocyanate group bound to a tertiary carbon atom.

Examples of suitable diisocyanates are 1,4-diisocyanato-4-methyl-pentane, 1,5-diisocyanato-5-methylhexane, 3(4)-isocyanatomethyl-1-methylcyclohexylisocyanate, 1,6-diisocyanato-6-methyl-heptane, 1,5-diisocyanato-2,2,5-trimethylhexane and 1,7-diisocyanato-3,7-dimethyloctane, and 1-isocyanato-1-methyl-4-(4-isocyanatobut-2-yl)-cyclohexane, 1-isocyanato-1,2,2-trimethyl-3-(2-isocyanato-ethyl)-cyclopentane, 1-isocyanato-1,4-dimethyl-4-isocyanatomethyl-cyclohexane, 1-isocyanato-1,3-dimethyl-3-isocyanatomethyl-cyclohexane, 1-isocyanatol-n-butyl-3-(4-isocyanatobut-1-yl)-cyclopentane and 1-isocyanato-1,2-dimethyl-3-ethyl-3-isocyanatomethyl-cyclopentane, respectively.

The preferred isocyanates are 3(4)-isocyanato-methyl-1-methylcyclohexylisocyanate (IMCI) and isophorone diisocyanate.

Monomers, oligomers and polymers can all be used as the compounds that can react with isocyanate groups. Such compounds contain reactive groups that can form a chemical bond with isocyanate groups.

Examples of suitable reactive groups are alcohols and amine groups.

Examples of suitable compounds are hydroxyethyl(meth) acrylate, hydroxy($C_2$–$C_{12}$)alkyl vinyl ether, 4-hydroxybutyl (meth)acrylate, aminopropyl vinyl ethers, aminoalkyl vinyl ether, aminopropyl-tri(m)ethoxysilane and aminoalkyltrialkoxysilane.

Preferably the diisocyanate, for example IMCI, is combined with a selective catalyst, as a result of which no chain lengthening or crosslinking will take place.

As the catalyst use can be made of an ionogenic metal complex based on a metallic element from any one of groups III, IV or VII of the Periodic System with exchangeable counterions. Examples of suitable catalysts are titanium (IV) butoxide, zirconium (IV) acetylacetonate, zirconium (IV) butoxide, tin (IV) acetate, manganese (III) acetylacetonate, titanium (IV) isopropoxide, zirconium (IV) 2-ethylhexanoate and tin (IV) chloride.

The unmodified and modified polymers according to the invention can be very widely used in technically different fields, both in thermosetting and in thermoplastic applications.

The invention also relates to a composition comprising the condensation polymer and/or the modified condensation polymer according to the invention, an active substance and a polymer, as well as to a process for incorporating an active substance in an object comprising at least a polymer composition, by bringing the object into contact with the active substance. More in particular, the invention relates to the dying of polymer fibres in a bath containing a solution of a dye, in which the dye, in this case the active substance, penetrates the fibre.

A drawback of the currently applied processes is that the active substance is with difficulty absorbed into the polymer object. It is for example not really possible to dye polypropylene fibres because the dye does not, or only with great difficulty, penetrate the polypropylene fibre. Surprisingly, it has now been found that the active substance is very well absorbed if the object consists of a polymer composition comprising the condensation polymer according the invention with terminal or pendant groups that are compatible with the polymer.

A further advantage is that new combinations of active substances and polymers have become possible, because active substances that are not or not at all absorbed into the plastic itself are absorbed into the plastic composition containing the (modified) condensation polymer according to the invention.

The invention creates new, surprising possibilities. It is for example possible for a highly effective active substance that cannot endure the processing of the plastic composition into the part—for example because the active substance degrades at the temperatures prevailing during the processing—to be incorporated in the composition after the processing.

To establish compatibility of the terminal or pendant groups of the condensation polymer according to the invention, the groups may be modified as described previously in this application.

Active substances that can be used in the process according to the invention are for example antistatic agents, adhesives, odorous substances, fireproofing agents, flame retardants, antioxidants, UV-stabilisers and dyes. Preferably use is made of dyes. Examples of suitable types of dyes are azo, azine, perinone, anthraquinone, xanthene, phthalocyanine, triarylmethane, indophenol, coumarin and diazomethane dyes. Mixtures of dyes are also suitable. Criteria in the selection of the dye are for example the desired colour and the dye's thermal and UV resistance.

By using the process according to the invention the active substances can be incorporated in parts of many kinds of plastics. Thermoplastics, thermosetting plastics as well as rubbers are suitable. The invention is suitable for both homo- and copolymers. Mixtures of plastics can also be used. Examples of suitable plastics are polyolefines, such as low-density polyethylene (LDPE), high-density polyethylene (HDPE), vLDPE, LLDPE, polypropylene (PP), which is understood to include PP homopolymers and PP copolymers such as random ethylene/propylene copolymers and PP block copolymers with an ethylene/propylene phase, vinyl polymers, styrene polymers, acrylic polymers, fluorine-containing polymers, polyamides, polycarbonates, polyoxyalkylenes, polyimides, polybenzimidazoles, polyphenylene oxides, polyacrylonitriles, polyesters, phenol-formaldehydes, aminoplastics, epoxy resins, polyurethanes, styrene-butadiene rubber, butyl rubber, chlorobutyl rubber, chloroprene rubber, nitrile rubber, butadiene rubber, isoprene rubber, ethylene-propylene rubbers (EPM, ethylene-propylene monomer, and EPDM, ethylene-propylene-diene monomer), silicone rubbers, urethane rubbers, acrylate rubbers, fluorine-containing rubbers and/or cyclopentene rubbers.

Preferably, the condensation polymer according to the invention is used in an amount of 10 weight % or less, more preferably is an amount of 5 weight % or less, with respect to total weight of the composition.

In the process according to the invention the moulded plastic part can in several ways be brought into contact with the active substance. It is for example possible to immerse the part or coat it with a liquid active substance or to treat the moulded part in this manner with a solution, a melt, a slurry or an emulsion of an active substance. It is also conceivable that a part is brought into contact with a gaseous active substance or with an active substance in the solid phase.

In a preferred embodiment the invention relates to a process in which a polyolefine, more preferably polypropylene, is used as the polymer in the polymer composition of the part.

Such parts can very well be printed with the aid of the process according to the invention, without having to subject the surface of the part to a special treatment, such as a corona treatment. Such parts can also very well be dyed, by immersing them in a bath containing a solution of a dye. In this way parts of a polyolefine with very deep, intense colours can be obtained, whereas this is not achievable, or achievable with great difficulty, with the known processes.

The advantages of the invention become particularly evident if the process according to the invention is used in dying fibres, in particular polypropylene fibres.

In particular, dying fibres, especially polypropylene fibres, according to the known processes involves problems, in connection with the poor absorption of the dyes into the fibres. It is not possible to modify the fibres' surface to improve the absorption of dye, such as etching the fibre surface, because these modifications of the fibres generally adversely affect the fibres' mechanical properties, such as tensile strength and stiffness.

Fibres that have been dyed with the aid of the process according to the invention can have bright, deep colours and there are no problems with the fibres' mechanical properties.

What is claimed is:

1. Condensation polymer having at least one dialkylamide endgroup connected through the polymer backbone to a unit derived from an alkylamide, the connection comprising at least one ester linkage.

2. Condensation polymer according to claim 1, wherein the polymer contains at least two groups according to formula (I)

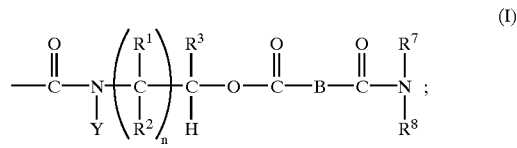

wherein:

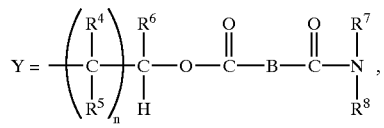

H, a ($C_1$–$C_{20}$) alkylgroup or a ($C_6$–$C_{10}$) arylgroup;

B=a ($C_6$–$C_{24}$) aryldiradical or a ($C_2$–$C_{24}$) alkyldiradical;

$R^1$, $R^2$, $R^3$, $R^4$, $R^5$ and $R^6$ are, independently of one another, H, ($C_6$–$C_{10}$) arylgroups or ($C_1$–$C_8$) alkylgroups;

$R^7$ and $R^8$ are, independently of one another, optionally heteroatom substituted ($C_6$–$C_{10}$) arylgroups or optionally heteroatom substituted ($C_1$–$C_{28}$) alkylgroups; and n=1–4.

3. Condensation polymer according to claim 2, wherein n=1.

4. Condensation polymer according to claim 1, wherein the polymer is a polymer according to formula (II):

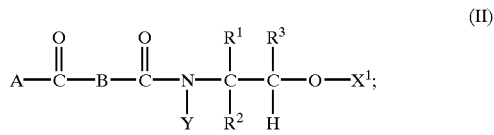

wherein:

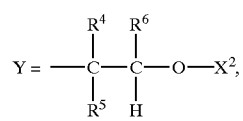

H, a ($C_1$–$C_{20}$) alkylgroup or a ($C_6$–$C_{10}$) arylgroup;

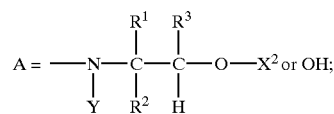

B=a ($C_6$–$C_{24}$) aryldiradical or a ($C_2$–$C_{24}$) alkyldiradical;

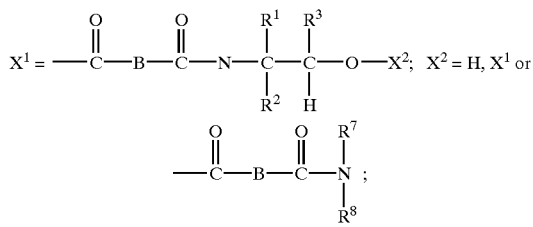

$R^1$, $R^2$, $R^3$, $R^4$, $R^5$ and $R^6$ are, independently of one another, H, ($C_6$–$C_{10}$) arylgroups, ($C_1$–$C_8$) alkylgroups or —$CH_2$—$OX^2$;

$R^7$ and $R^8$ are, independently of one another, optionally heteroatom substituted ($C_6$–$C_{10}$) arylgroups or optionally heteroatom substituted ($C_1$–$C_{28}$) alkylgroups.

5. Condensation polymer according to claim 4, wherein n=1.

6. Condensation polymer according to claim 1, wherein the polymer has a number of dialkylamide end groups $\geq 3$ and the polymer is represented by formula (III):

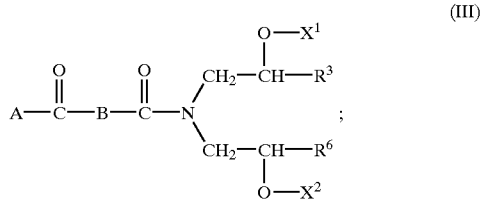

(III)

wherein;

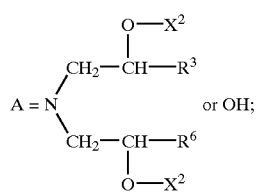

or OH;

B=a ($C_6$–$C_{24}$) aryldiradical or a ($C_2$–$C_{24}$) alkyldiradical;

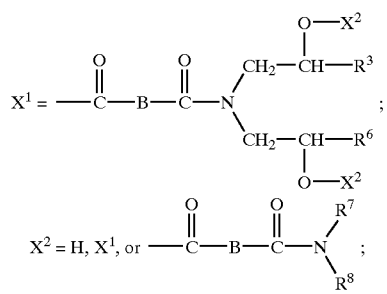

$R^3$ and $R^6$ are chosen from H, ($C_6$–$C_{10}$) arylgroups or ($C_1$–$C_8$) alkylgroups;

$R^7$ and $R^8$ are, independently of one another, optionally heteroatom substituted ($C_6$–$C_{10}$) arylgroups or optionally heteroatom substituted ($C_1$–$C_{28}$) alkylgroups.

7. Condensation polymer according claim 1, wherein $R^3$ and $R^6$ are ($C_1$–$C_4$) alkyl groups.

8. Condensation polymer according claim 7, wherein the alkyl group is a methyl- or ethyl-group.

9. Condensation polymer according to claim 1, wherein $R^7$ and $R^8$ are hetero-atom substituted ($C_1$–$C_{20}$) alkyl groups.

10. Condensation polymer according to claims 1, wherein B is an (alkyl-)1,2-ethylene in which the alkyl is selected from the group consisting of methyl, octenyl, nonenyl, decenyl, undecenyl or dodecenyl, (methyl)-1,2-ethylidene, 1,3-propylene, (methyl-) 1,2-cyclohexyl, (methyl-)1,2-phenylene, 1,3-phenylene, 1,4-phenylene, 2,3-norbornyl, 2,3-norbornen-5-yl and (methyl-)1,2 cyclohex-4-enyl radicals.

11. Condensation polymer according to claim 1, wherein the weight average molecular mass of the polymer is between 600 g/mol and 50,000 g/mol.

12. Condensation polymer according to claim 1, wherein the number average molecular mass of the polymer is between 500 g/mol and 15,000 g/mol.

13. Condensation polymer according to claim 1, wherein the average number of dialkylamide end groups per molecule is between 2 and 250.

14. Process for the preparation of a condensation polymer according to claim 1, comprising: polycondensing a mono-hydroxyalkylamide of a dicarboxylic acid, bis-hydroxyalkylamide of a dicarboxylic acid or mixtures thereof in the presence of a mono-dialkylamide of a dicarboxylic acid.

15. Process for the preparation of a condensation polymer according to claim 1, comprising: reacting, in a one-step procedure, a cyclic anhydride, a dialkylamine and an alkanolamine to form hydroxyalkylamide and dialkylamides; and, subsequently, obtaining a polyesteramide through polycondensation.

16. Process for the preparation of a condensation polymer according to claim 1, comprising: reacting a dialkylamide, an alkanolamine and a compound containing an acid group and an activated acid group; and, subsequently, obtaining a polyesteramide through polycondensation.

17. Process for the preparation of a condensation polymer according to claim 1, comprising: reacting a cyclic anhydride and an alcohol; subsequently reacting the reaction product of a cyclic anhydride and an alcohol in situ with an alkanolamine; and, subsequently obtaining a polyesteramide through polycondensation.

18. Condensation polymer according to claim 11, wherein the weight average molecular mass of the polymer is between 800 g/mol and 25,000 g/mol.

19. Condensation polymer according to claim 12, wherein the number average molecular mass of the polymer is between 700 g/mol and 4,000 g/mol.

20. Condensation polymer according to claim 13, wherein the average number of dialkylamide end groups per molecule is between 3 and 50.

* * * * *

UNITED STATES PATENT AND TRADEMARK OFFICE
CERTIFICATE OF CORRECTION

PATENT NO. : 6,730,771 B2
DATED : May 4, 2004
INVENTOR(S) : Van Benthem et al.

It is certified that error appears in the above-identified patent and that said Letters Patent is hereby corrected as shown below:

Title page,
Item [*] Notice, change "bydays.days" to -- by 426 days --
Item [63], Related U.S. Application Data, change "Feb. 23, 2000" to
-- Mar. 23, 2000 --

Column 1,
Line 9, change "Feb. 23, 2000" to -- Mar. 23, 2000 --

Signed and Sealed this

Twenty-sixth Day of July, 2005

JON W. DUDAS
*Director of the United States Patent and Trademark Office*